United States Patent Office 3,830,855
Patented Aug. 20, 1974

3,830,855
PROCESS FOR PRODUCING CONJUGATED DIENE POLYMERS
Jihei Inomata, Tokyo, and Seiichi Hino and Tatsuo Tani, Yokohama, Japan, assignors to Mitsubishi Chemical Industries, Ltd., Tokyo, Japan
No Drawing. Filed July 31, 1972, Ser. No. 276,788
Int. Cl. C08d 27/00
U.S. Cl. 260—635 E        3 Claims

ABSTRACT OF THE DISCLOSURE

Conjugated diene polymers are produced by reacting from 0.5 to 2 moles of a haloalkyleneoxide with one mole of a living polymer prepared by reacting a conjugated diolefin or a mixture of the conjugated diene with a vinyl compound having the formula: $CH_2=CR_1R_2$, wherein $R_1$ represents a hydrogen atom or an alkyl group and $R_2$ represents an aryl group or a pyridyl group in the presence of an alkali metal or an organoalkali metal compound.

BACKGROUND OF THE INVENTION

Field of the Invention

This invention relates to a process for producing a reactive liquid conjugated diene polymer.

Description of the Prior Art

Various processes for producing conjugated diene polymers containing reactive groups such as epoxy, hydroxyl, etc., are well known to those skilled in the art. For instance, processes such as the reaction between a large excess of epichlorohydrin and a living polymer such as polybutadiene, and the reaction of a polyepoxide such as limonene diepoxide with living polybutadiene are well known. However, deficiencies are inherent in the products of both reactions. The polymers prepared by the former process have reactive groups only as the terminals of the polymer, which result in a polymer difficult to cure. The polymers prepared by the latter process can be cured, but the cured polymers are much too brittle. Therefore, these products have not been of much commercial value.

SUMMARY OF THE INVENTION

Accordingly, it is an object of this invention to provide a process for producing a conjugated diene polymer containing pendant reactive moieties such as an hydroxyl group, a carboxyl group or a polymerizable unsaturated bond in the polymer chain.

It is another object of this invention to provide a process for producing a liquid conjugated diene polymer which is easily processed.

Yet another object of this invention is to provide a process for producing a liquid conjugated diene polymer which is easily cured to form various products from rubber-like elastomers to hard resins by treating the reactive group in the chain with a compatible curing agent.

Still another object of this invention is to provide a process for preparing a conjugated diene polymer useful in various applications such as electric insulators, sealers, shock absorbers, etc.

These and other objects of this invention can be attained by reacting from 0.5 mole to 2 moles of a haloalkylene oxide with one mole of a living polymer which is prepared by reacting an alkali metal or an organoalkali metal compound with a conjuagted diene or a mixture of a conjugated diene and a vinyl compound having the formula:

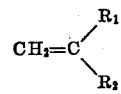

wherein $R_1$ represents a hydrogen atom or an alkyl group, and $R_2$ represents an aryl group or a pyridyl group.

DESCRIPTION OF THE PREFERRED EMBODIMENTS

The living polymers used as the starting material in this invention are liquid polymers having an alkali metal at both ends of the polymer. The polymers are prepared by reacting an alkali metal or an organo-alkali metal compound with a conjugated diolefin or a mixture of a conjugated diolefin and a vinyl compound and range in molecular weight from 500 to 10,000, and especially from 1,000 to 5,000. In order to prepare cured polymeric products having excellent low temperature characteristics, it is preferable to have a greater content of conjugated diolefin or diene units in the living conjugated diene polymer than vinyl units, and especially preferable to have 30% more diene units than vinyl units. The conjugated dienes, which are used as the monomer starting material of the liquid living polymer, can be butadiene-1,3; 2-methylbutadiene-1,3; pentadiene-1,3; 2,3-dimethylbutadiene-1,3; 1-phenylbutadiene-1,3, etc.

Vinyl compounds having the formula: $CH_2=CH_1R_2$ used in conjunction with a conjugated diene can be vinyl aromatic compounds such as styrene, $\alpha$-methylstyrene, tert-butylstyrene, paramethoxystyrene and vinyltoluene; and vinyl pyridines such as 2-vinylpyridine and 4-vinylpyridine. The amount of the vinyl compound employed is dependent upon the physical characteristics desired in the cured product polymers and is usually less than 75 weight percent, preferably less than 50 weight percent and especially less than 25 weight percent based on the total monomer content of the product polymers.

The alkali metal used as the initiator in the process can be lithium, sodium, potassium, rubidium, cesium, etc. The organoalkali metal compound used as the initiator can be an alkali metal complex of naphthalene, anthracene and biphenyl; a complex of dienes, such as the dimer, trimer and tetramer lithium complex of butadiene and isoprene; a complex of styrene and a dialkali metal hydrocarbon compound such as 1,4-dialkali metal butane, 1,5-dialkali metal pentane, 1,10-dialkali metal decane, 1,2-dialkali metal-1,2-diphenylethane, 1,4-dialkali metal-1,1,4,4-tetraphenylbutane. When a liquid living conjugated diene polymer having a high content of diene units is desired, lithium metal or organolithium compounds such as the dimeric lithium complexes of butadiene or isoprene are preferably used.

The alkali metal complexes of conjugated dienes can be prepared by the following process. An alkali metal is reacted with a polycyclic aromatic compound at −20–30° C., preferably 0–25° C., in a diluent to form an alkali metal complex of the polycyclic aromatic compound. The polycyclic aromatic compound can be naphthalene, biphenyl, phenanthrene, anthracene, etc., and is usually employed in the diluent at concentrations ranging from 200 to 500 millimole per litre. The polycyclic aromatic compound-alkali metal adduct is filtered to remove unreacted alkali metal, and then is reacted with any one of said conjugated dienes. It is necessary to conduct the reaction at temperatures lower than 0° C. to prevent the formation of higher polymerization products of the conjugated diene. Preferably, the reaction is conducted at temperatures lower than −20° C. and as low as −78° C. Suitable diluents include aprotonic Lewis bases such as aliphatic ethers, alicyclic ethers, aliphatic polyethers, aromatic ring containing ethers and tertiary amines. Specific examples include dimethyl ether, methylethyl ether, diethyl ether, diisopropyl ether, tetrahydrofuran, dioxane, diethyleneglycol dimethyl ether, ethyleneglycol dimethyl ether, anisole, ethylphenyl ether, trimethylamine, triethylamine, dimethylaniline, etc. Economic advantages are realized when the diluents are mixed with a hydrocarbon such as hexane, heptane, benzene, toluene, xylene, cyclohexane, methylcyclohexane, etc.

Using the aforementioned process, an initiator solution can be prepared containing a dialkali metal complex of an oligomer which is principally a dimer of a conjugated diene. In the preparation of a liquid living polymer using the above initiator, the polymerization is enhanced by the addition of a hydrocarbon solvent such as hexane, heptane, benzene, toluene, xylene, cyclohexane, methylcyclohexane, etc. Preferably, the hydrocarbon solvent contains a Lewis base in order to more uniformly react them. These Lewis bases can be oxygen containing Lewis bases such as dimethyl ether, diethyl ether, diisopropyl ether, tetrahydrofuran, dioxane, diethyleneglycol dimethyl ether, ethyleneglycol dimethyl ether, anisole and ethylphenyl ether; and nitrogen containing Lewis bases such as trimethylamine, triethylamine and dimethylaniline. However, the addition of a Lewis base to the solvent mixture causes a decrease in the content of diene units in the polymeric product. When a living polymer containing a high content of diene units is desired, the amount of Lewis base added to the reaction solution should be minimized.

The essential feature of this invention is the reaction of specific amounts of a haloalkyleneoxide with the liquid living polymers previously described. The haloalkyleneoxide compounds have the formula:

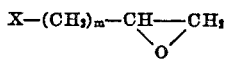

wherein X represents a halogen atom and $m$ represents an integer greater than or equal to one. Suitable compounds include epichlorohydrin, epibromohydrin, epifluorohydrin, chlorobutylene oxide, bromobutylene oxide, etc. Preferably epichlorohydrin is employed. The amount of haloalkyleneoxide used in the reaction usually ranges from 0.5 mole to 2 moles and is preferably used in quantities from 0.6 to 1.7 moles per mole of liquid living polymer. When more than 2 moles of the haloalkyleneoxide is used per mole of liquid living polymer, the resulting polymer has haloalkyleneoxide units bonded at both ends of the polymer. These polymers are difficult to cure. When less than 0.5 mole of the haloalkyleneoxide units is used per mole of liquid living polymer, the number of haloalkyleneoxide units bonded to the liquid living polymer is less than one. The resulting polymers are also difficult to cure. However, when the amount of haloalkyleneoxide employed is within the indicated preferred range, polymers are obtained wherein several molecules of the living polymers are bonded through a haloalkyleneoxide unit to each other. When haloalkyleneoxide units are bonded to the living polymer, the epoxide ring of the haloalkyleneoxide is opened and the resulting oxide associates with the alkali metal cation present in the living polymer to form a functional group abbreviated as —OM, wherein M represents an alkali metal. Therefore, the molecular weight and the number of —OM groups in the product polymer is controlled by maintaining the amount of haloalkyleneoxide units added within the preferred range. The reaction of the liquid living polymer with the haloalkyleneoxide is conducted at —50–100° C., preferably 0–80° C., in the same solvent used in the reaction for the polymerization of the living polymer. A satisfactory, purified, reactive conjugated diene polymer can be obtained by precipitating the polymer in the presence of an antioxidant such as di-tert-butyl-p-cresol in accordance with conventional methods.

The reactive conjugated diene polymer consists of modified haloalkyleneoxide units having pendant reactive —OM groups bonded to them between the living polymer units. Since the final product polymer is in a liquid form similar to the living polymer, processing of the polymers is made easier. The product polymer can have —OM groups at the ends of the polymer as well as at points within the chain. Discrimination between these two types of —OM groups is accomplished by referring to the internal groups as pendant —OM groups.

The pendant —OM groups of the conjugated diene polymer can be modified by treating the polymer with a protonic acid to convert it to its polyhydroxy form. The conversion is accomplished by neutralizing the —OM groups with a protonic acid at temperatures lower than 100° C., especially between 0–25° C. Suitable protonic acids include inorganic acids such as hydrochloric acid, sulfuric acid, phosphoric acid, and organic acids such as acetic acid. The protonic acid is used as an aqueous solution or as a solution of a lower aliphatic alcohol or a mixture thereof. Gaseous acids can also be conveniently used.

The conjugated diene polymer of this invention is referred to as a "polyhydroxydiene polymer." The polyhydroxydiene polymer can be cured by adding an appropriate agent. Preferable agents include compounds such as polyhydroxy polyesters and/or polyhydroxy polyethers. These agents are used because rubber-like elastomers are formed which have good physical properties. Preferably, reinforceable fillers are also added to the polymer. A satisfactory polyhydroxy polyester can be the linear condensation polymer prepared from the reaction between a dibasic acid and a glycol, which has hydroxy groups at both terminals of the polymer. Suitable dibasic acid components include adipic acid, succinic acid, pimelic acid, sebacic acid, phthalic acid, terephthalic acid, etc. Suitable glycol components include ethyleneglycol, 1,2-propyleneglycol, 1,6-hexanediol, butanediol, diethyleneglycol, etc. The glycol component can also contain an amount of a triol such as trimethyl propane triol, hexane triol, glycerine or an amino alcohol such as ethanolamine. Other suitable glycol components include ring-opened polymer lactones such as $\beta$-propiolactone, $\beta$-butyrolactone, bischloromethylpropiolactone, $\gamma$-valerolactone, $\epsilon$-caprolactone, pivalolactone, etc.

Suitable polyhydroxy polyether agents can be prepared by the ring opening polymerization of an alkyleneoxide such as ethyleneoxide and propyleneoxide with a polyalcohol such as ethyleneglycol and glycerine in the presence of an alkali metal catalyst such as potassium hydroxide. Suitable polyhydroxy polyethers include polyethylene ether glycol, polypropylene ether glycol, etc. Other effective polyhydroxy polyethers include polytetramethylene ether glycol. Depending upon the type of product desired, polyhydroxy polyesters and polyhydroxy polyethers of an average molecular weight from 500 to 20,000 can be used. Suitable reinforceable fillers include various commercial fillers such as carbon black, fine silicate powder, clay, calcium carbonate, basic magnesium carbonate, etc. The quantities of polyhydroxy polyesters and/or polyhydroxy polyethers used range from 1–100% by weight, especially 5–50% by weight, based on the weight of polyhydroxydiene polymer. The quantities of reinforceable filler used range from 1–100% by weight, especially 5–100% by weight, based on the weight of polyhydroxydiene polymer.

Curing agents satisfactory for use with the polyhydroxydiene polymers of this invention include polyisocyanates such as toluenediisocyanate, diphenylmethanediisocyanate, naphthalenediisocyanate, diphenylsulfonediisocyanate, triphenylmethanetriisocyanate, hexamethylenediisocyanate, diphenylether-4,4'-diisocyanate, xylylenediisocyanate; polybasic acids such as phthalic acid, pyromellitic acid, tetrahydrophthalic acid, succinic acid, maleic acid; polybasic acid anhydrides; polyepoxy compounds such as the diglycidyl ether of Bisphenol A, butadiene epoxide, vinylcyclohexene diepoxide, limonene diepoxide, etc. When a polyisocyanate is used as the curing agent, curing is accomplished at relatively low temperatures such as room temperature. If too large of an amount of curing agent is used, it is difficult to produce a suitably cured product. The amounts of curing agent used range from 0.8 to 1.2, preferably from 0.8 to 1.0 equivalents per equivalent of the total hydroxy groups in the polymer. In the curing process, catalytic accelerators can be added which include amines such as triethylenediamine, trialkylamine, dialkylaniline, N-alkylmorpholine, N,N'-dialkylbenzylamine, N,N'-dialkylpiperidine, pyridine and tetraalkyl ethylenediamine and organotin compounds such as alkyltin laurate and alkyltin acetate. The catalytic accelerators are added in amounts from 0.01 to 3% by weight based on the weight of polyhydroxydiene polymer. When water or a diamine such as diaminobenzene, benzidine or 4,4'-methylene bis-(2-chloroaniline) is used as the accelerator, the amount of accelerator used ranges from 1 to 5% by weight based on the weight of polyhydroxydiene polymer.

The polyhydroxydiene polymers prepared by the process of this invention are liquids and are therefore very easy to blend with the indicated additives. Curing of a mixture of the polyhydroxydiene polymer and said additives can be accomplished by simply adding the curing agent. The polymeric mixture can be accomplished by simply adding the curing agent. The polymeric mixture can be heated to temperatures up to 200° C., in order to mold the polymer into various shapes by casting, injection molding or transfer molding, etc. techniques. The molding operations are quite easy in comparison to conventional operations using synthetic rubber or natural rubber. The cured products of this invention are rubber-like elastomers whose properties are equal or superior to those of the conventional rubbers. Specifically, a cured polymer containing a living polymer component having 30% more diene units than vinyl units has excellent low temperature characteristics.

The uncured, liquid polyhydroxydiene polymers of this invention can be reacted with a saturated polycarboxylic acid to introduce carboxyl groups into the polymer chain. In the reaction with the polymer, the polycarboxylic acid can be used in the form of an acid anhydride; an ester of an alcohol such as methanol, ethanol; or in acid halide wherein the halide is chloride, bromide or iodide. However, it is preferable to use an acid anhydride. Specific saturated polycarboxylic acids include an aliphatic polycarboxylic acid such as succinic acid; aromatic polycarboxylic acids such as phthalic acid, isophthalic acid, terephthalic acid, pyromellitic acid, and acyclic polycarboxylic acids such as hexahydrophthalic acid, tetrahydrophthalic acid and nadic acid. The amount of the saturated polycarboxylic acid added to the polyhydroxydiene polymers is more than the equivalent amount of the total number of —OM and —OH groups in the polymer. When a dicarboxylic acid is used, more than two equivalents of the acid are required per equivalent of hydroxy groups in the polymer. Quantities of the saturated polycarboxylic acids less than those indicated should not be used because curing of the polyhydroxydiene polymer results. The reaction of the polyhydroxydiene polymer with the saturated polycarboxylic acid can be conducted at temperatures from 0 to 100° C., preferably from 20 to 80° C., in the same solvent used in the synthesis of the living polymer compound. In order to introduce a carboxyl group containing compound into the polyhydroxydiene polymer of this invention, the —OH or —OM groups of the polymer are reacted with the carboxyl group of the saturated polycarboxylic acid to form ester linkages. For example, when phthalic acid is used, polycarboxyl conjugated diene polymers having the groups shown in the following formula are formed:

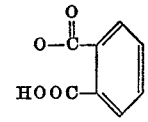

The polycarboxyl conjugated diene polymer (hereinafter referred to as a polycarboxydiene polymer) is a liquid, and can be easily cured by adding a curing agent, such as a polyepoxy compound, a polyisocyanate, which can be the same material used to cure the polyhydroxydiene polymers of this invention; a polyamine such as ethylenediamine, diethylenetriamine, triethylenetetramine, tetraethylenepentamine, phenylenediamine, benzidine, 4,4'-methylene bis(2-chloroaniline); and a polyhydroxyl compound such as trimethylolpropane, pentaerythritol, butyleneglycol, and ethyleneglycol. Curing is accomplished by adding 0.8–1.2 equivalents, preferably 0.8–1.0 equivalents, of the curing agent based on the number of carboxyl groups in the polycarboxydiene polymer, to the polycarboxydiene polymer together with any additives at temperatures from 0 to 200° C., preferably from 20 to 150° C. If quantities of the curing agent greater than the indicated range are used, suitable curing of the polymer is difficult. Since the polycarboxydiene polymer is a liquid, it is very easy to perform casting, injection molding and transfer molding processes during the curing process. The products prepared by this process range from rubber-like elastomers to hard resins.

The liquid polyhydroxydiene polymer of this invention can be reacted with an unsaturated mono- or poly-carboxylic acid containing a reactive double bond to introduce a polymerizable double bond in the polymer chain. Suitable unsaturated carboxylic acids containing a polymerizable double bond include acrylic acid, methacrylic acid, cinnamic acid, maleic acid, fumaric acid, etc. Other forms of the unsaturated carboxylic acid suitable for use include acid anhydrides, esters of alcohols such as methanol, ethanol; or acid halides wherein the halides are chloride, bromide and iodide. The reaction of a polyhydroxydiene polymer with an unsaturated polycarboxylic acid can be conducted at temperatures ranging from 0 to 100° C., preferably from 30 to 80° C. in the same solvent used for the synthesis of the living polymer component of the polyhydroxydiene polymer. A one mole quantity of the unsaturated carboxylic acid is reacted per mole of —OM or —OH group in the polyhydroxydiene polymer. In the reaction, a radical polymerization inhibitor such as hydroquinone, benzoquinone, 2,6-dichlorobenzoquinone, 2,5-dinitrobenzoquinone, trinitrobenzene, dinitrobenzene, 2,6 - ditert - butyl - p - cresol, etc. is added in quantities ranging from 0.01 to 2.0% by weight based on the polyhydroxydiene polymer. A product polymer is obtained containing a polymerizable unsaturated bond when the resulting reaction mixture is washed with water and the solvent is removed. The polymer can be purified by reprecipitation from a toluene-methanol solution in the presence of a radical polymerization inhibitor. An infrared spectrum of the product polymer indicates the presence of ester linkages in the polymer. This observation substantiates the reaction between the unsaturated carboxylic acid and the —OM or —OH groups of the polyhydroxydiene polymer.

As an example, the polymer prepared by reacting a polyhydroxydiene polymer with acrylic chloride would seem to have the following ester groups at points within the polymer chain:

The conjugated diene polymer containing many polymerizable double bonds (hereinafter referred to as a polymerizable diene polymer) is also a liquid, and can be easily cured by adding a radical polymerization initiator, if needed, with the curing agent. Suitable radical polymerization initiators include organic peroxides such as dicumyl peroxide, 2,5-dimethyl-2,5-di(tert-butylperoxy) hexane, tert-butyl-cumylperoxide, di-tert-butyl-peroxide, cyclohexanone peroxide, methylethylketone peroxide, acetyl peroxide, succinic peroxide, propionyl peroxide, lauroyl peroxide; azo compounds such as azobis(isobutyronitrile), azobismethylvaleronitrile, azobiscyclohexane carbonitrile. When an organic peroxide is used, a heavy metal compound which acts as an accelerator is added. The organic peroxides can also act as redox initiators by combining them with suitable reducing agents. Suitable curing agents for the polymerizable diene polymers include vinyl compounds such as styrene, 4-tert-butylstyrene, chlorostyrene, divinylbenzene, methylmethacrylate, ethylmethacrylate, propylmethacrylate, butylmethacrylate, octylmethacrylate, methylacrylate, ethylacrylate, propylacrylate, butylacrylate, octylacrylate, ethyleneglycoldiacrylate, diethyleneglycol diacrylate, ethyleneglycol dimethacrylate, diethyleneglycol dimethacrylate, and polyallyl compounds such as diallylphthalate, triallylisocyanurate, diallyl ether, etc. The amount of the curing agent used ranges from 0 to 200% by weight, preferably from 50 to 10% by weight, based on the amount of polymerizable diene polymer. Curing can be conducted by admixing the polymerizable diene polymer with a polymerization initiator if needed, together with a curing agent, fillers, additives, etc. The polymer is shaped by casting, injection molding or transfer molding. Because the polymerizable diene polymer is a liquid, cured products can easily be obtained by simple procedures. Curing temperatures range from 0 to 250° C., usually from 0 to 200° C. Careful measures must be taken to exclude oxygen while curing the polymer since oxygen inhibits curing of the polymer. When the amount of the curing agent added to the polymer is relatively small, the resulting cured product is a strong rubber-like elastomer having sufficient elasticity even at low temperatures. If the amount of vinyl monomer incorporated in the polymerizable diene polymer is high, the resulting cured product is a hard resin possessing a high impact strength.

In summary, the polyhydroxydiene polymers of this invention are liquid polymers containing a certain number of original living polymer units throughout which are dispersed hydrocarbon units having pendant —OH groups attracted to them. The number of —OH groups and the molecular weight of the polymer can be controlled by carefully selecting the amount of haloalkyleneoxide to be reacted with the living polymer. The polyhydroxydiene polymer can also be reacted with a saturated polycarboxylic acid to form a liquid polycarboxydiene polymer. The polyhydroxydiene polymer can be reacted with an unsaturated mono- or poly-carboxylic acid containing a polymerizable double bond to form a liquid polymerizable diene polymer. Various articles ranging from rubber-like elastomers to hard resins can be produced when the polyhydroxydiene polymer, the liquid polycarboxydiene polymer, and the liquid polymerizable diene polymer are cured with an appropriate curing agent. Because the polyhydroxydiene polymers, the polycarboxydiene polymers, and the polymerizable diene polymers are liquids, handling of these polymers in subsequent processes is easy. For example, curing these materials while processing by pour molding, injection molding or transfer molding techniques is easily conducted even on a large scale. The rubber-like elastomers of this invention possess excellent physical characteristics such as high tensile strengths and good elongation properties which are the same or superior to those of the natural rubbers and synthetic rubbers.

Having now generally described the invention, a further understanding can be attained by reference to certain specific Examples which are provided herein for purposes of illustration only and are not intended to be limiting in any manner unless otherwise specified.

EXAMPLE 1

A 0.26 g.-atom quantity of lithium metal was reacted with 0.02 mole of purified naphthalene in 100 millilitres of diethyl ether under a purified argon atmosphere. A 0.2 mole quantity of isoprene was added to the reagent and was reacted at $-25°$ C. After completion of the reaction, unreacted lithium metal was filtered. A 10 millimole quantity of the 0.5 N dilithium initiator reagent was added to a flask followed by a small amount of butadiene while under an argon atmosphere to uniformly polymerize it. After the butadiene was polymerized, the diethyl ether was removed under a reduced pressure. To the flask was added 500 millilitres of cyclohexane and 50 g. of butadiene, and the butadiene was polymerized. After the polymerization, 15 millilitres of tetrahydrofuran and 0.6 millilitres of epichlorohydrin (0.8 moles per mole of the living polymer) were added and maintained at room temperature overnight while stirring. The resulting white, milk-colored, gel-like reaction product was decomposed by treatment with methanol-hydrochloric acid and isolated by conventional procedures. An analysis of the infrared spectrum confirmed that the polymer contained hydroxyl groups and that the micro-structure contained about 60% diene units. The inherent viscosity (25° C. in toluene) of the resulting polymer was 0.37 dl./g. This data indicates that the molecular weight of the polymer treated with epichlorohydrin was three times that of the living polymer which was not treated with epichlorohydrin. This fact shows that the resulting polymer contained two moles of hydroxyl groups per mole of polymer.

EXAMPLE 2

A living polybutadiene was prepared by polymerizing 50 g. of butadiene in the presence of 20 millimoles of the dilithium initiator prepared as in Example 1. The living polybutadiene was reacted with 1.56 millilitres of epichlorohydrin (1 mole per mole of living polymer). An analysis of the infrared spectrum confirmed that the resulting polymer contained hydroxyl groups and that the micro-structure contained about 50% diene units. The inherent viscosity of the resulting polymer was 0.34 dl./g., and the molecular weight of the polymer treated with epichlorohydrin was five times that of the living polymer. This fact shows that the resulting polymer contained six moles of hydroxyl groups per mole of polymer.

EXAMPLE 3

The living polymer prepared by the process of Example 2 was reacted with 1.88 millilitres of epichlorohydrin (1.2 moles per mole of living polymer) as revealed in Example 1. An analysis of the infrared spectrum confirmed that the resulting polymer contained hydroxyl groups and that the micro-structure contained about 50% diene units. The inherent viscosity of the resulting polymer was 0.30 dl./g. The molecular weight of the polymer treated with epichlorohydrin was three times that of the untreated living polymer. This fact shows that the resulting polymer contained four moles of hydroxyl groups per mole of polymer.

EXAMPLE 4

An 8 g. amount of sodium metal was reacted with 0.1 mole of purified naphthalene in 100 milliliters of tetrahydrofuran under a purified argon atmosphere. After the reaction, the unreacted sodium metal was filtered to obtain a 1.0 N sodium initiator solution. To a flask containing an argon atmosphere was added 40 millimoles of the initiator solution and 50 g. of btuadiene. After polymerization of the butadiene, 1.8 millilitres of epichlorohydrin (1.2 moles per mole of living polymer) was reacted with the polymer as revealed in Example 1.

Analysis of the infrared specrtum confirmed that the resulting polymer contained hydroxyl groups and that the micro-structure contained about 100% vinyl units. The inherent viscosity of the resulting polymer was 0.33 dl./g. The molecular weight of the polymer treated with epichlorohydrin was four times that of the untreated living polymer. This fact shows that the resulting polymer contained five moles of hydroxyl groups per mole of polymer.

EXAMPLE 5

The hydroxy polybutadiene prepared as shown in Examples 2, 3, and 4 was treated with an amount of toluene diisocyanate or an amount of polyarylpolyisocyanate equivalent to the number of hydroxyl groups present in the butadiene polymer. The mixture was heated to 110° C.–120° C. for 15 hours in a vacuum. A tight rubber-like elastomer was obtained having no adhesive properties.

EXAMPLE 6

A 37.5 g. amount of butadiene and 12.5 g. of styrene were copolymerized at room temperature in the presence of 20 millimoles of the dilithium initiator prepared as shown in Example 1. The resulting living polymer, which had a molecular weight of 2500, was treated with 30 millimoles of epichlorohydrin (1.5 moles per mole of living polymer) in tetrahydrofuran and the mixture was stirred overnight. The resulting polymer, which was separated and isolated as shown in Example 1, had a molecular weight of 5200 whose styrene content was 25 weight percent and wherein the diene units were 32 weight percent. Analysis of the infrared spectrum confirmed the presence of hydroxyl groups. A 10 g. quantity of the resulting polymer was admixed with 0.5 g. of toluenediisocyanate and 0.03 g. of dibutyltin dilaurate and the mixture was heated at 110–120° C. for 15 hours in a vacuum to yield a tight, rubber-like elastomer having no adhesive properties.

(Reference 1)

A 50 g. quantity of butadiene was polymerized in the presence of 10 millimoles of a dilithium intiator as prepared in Example 1. After the polymerization, 15 millilitres of tetrahydrofuran and 3 millilitres of epichlorohydrin (4 moles per mole of living polymer) were added to the living polymer, and the mixture was maintained overnight at room temperature. The resulting mixture was treated with methanol. A 10 g. quantity of the resulting polymer was uniformly admixed with 0.3 g. of toluenediisocyanate and heated at 120° C. for 10 hours in a vacuum. A sticky, viscous product was obtained but no presence of a rubber-like elastomer was found.

EXAMPLE 7

A 50 g. quantity of butadiene was polymerized in the presence of 40 millimoles of a dilithium initiator to yield a living polymer having a molecular weight of 1250. The living polybutadiene was reacted with 4.7 millilitres of epichlorohydrin (1.5 moles per mole of living polymer) and then treated with acid to yield polyhydroxypolybutadiene having a molecular weight of 2700. The product polymer contained three hydroxyl groups per molecule of polymer, 50% diene units and had a glass transition temperature of —68° C. A composition was formulated containing one hundred parts of the polyhydroxyl polybutadiene polymer uniformly admixed with 10 parts of a polyhydroxy polyester manufactured by Nippon Polyurethane Co., Ltd. (trade name Nippolane N 1006) having a hydroxyl value of 350, an acid value of less than 1.0, a viscosity of 15 poises at 75° C., 30 parts of carbon black manufactured by Mitsubishi Chemical Ind., Ltd. (HAF) and 0.35 parts of dibutyltin dilaurate. To the composition was added 15.2 parts of toluenediisocyanate as a curing agent, and the mixture was cast molded at 20° C. for 50 hours.

The resulting cured product had a tensile strength of 160 kg./cm.$^2$, a yield point in its elongation of 210%, and a hardness of 72 in JISK 6301—1962 (Japan Ind. Standard). The product was a strong elastomer even at the low temperature of —50° C. and was not brittle. Measurements of the tensile strength and elongation of the product were conducted with a Tensilon tester and a micro dambel test piece, at a velocity of 200 mm./min. and where the distance between the checks was 25 mm. at 20° C.

EXAMPLE 8

A composition was formulated containing 100 parts of a polyhydroxypolybutadiene polymer having a molecular weight of 2600, a hydroxyl value of 43, 75% diene units and a glass transition temperature of —84° C. and was prepared as shown in Example 7. The polymer was uniformly admixed with 10 parts of a polyhydroxy polyester (Nippolan N 1006), 30 parts of a carbon black (HAF) and 0.35 parts of dibutyltin dilaurate. The composition was uniformly admixed with 12.6 parts of toluenediisocyanate and the mixture was cast molded at 20° C. for 50 hours. The resulting cured product had a tensile strength of 139 kg./cm.$^2$, a yield point in its elongation of 250%, a hardness of 70 and a glass transition temperature of —80° C. The product had a strong elasticity even at —60° C.

EXAMPLE 9

A similar composition was prepared as shown in Example 7, except that 100 parts of a polyhydroxy polyester (Nippolan N 1006) and 0.6 parts of dibutyltin dilaurate were used. The composition was uniformly admixed with 35.0 parts of toluenediisocyanate and molded at 20° C. for 50 hours by pour molding. The resulting cured product had a tensile strength of 198 kg./cm.$^2$ and a hardness of 98.

EXAMPLE 10

A similar composition was prepared as shown in Example 8, except that 10 parts of a polyhydroxy polyester (Desmophen 800) were used. The composition was uniformly admixed with 11.4 parts of toluenediisocyanate and was molded at 20° C. for 50 hours by pour molding. The resulting cured product had an elongation of 410% at its yield point.

EXAMPLE 11

The composition prepared as shown in Example 8 was uniformly admixed with 15.2 parts of a polyisocyanate curing agent manufactured by Mitsubishi Chem. Ind., Ltd. (PAPI), and was cast molded as shown in Example 8. The resulting cured product had a tensile strength of 100 kg./cm.$^2$, a yield point in its elongation of 270%, and a hardness of 65.

EXAMPLE 12

A composition was formulated containing 100 parts of the polyhydroxy polybutadiene polymer described in Example 7 uniformly admixed with 10 parts of a polytetramethylene ether glycol having a molecular weight of 1,300 manufactured by Nippon Polyurethane Co., Ltd., 30 parts of carbon black (HAF) and dibutyltin dilaurate. The composition was admixed with 15.2 parts of toluenediisocyanate and was cast molded at 20° C. for 50 hours. The resulting cured product had a tensile strength of 115 kg./cm.$^2$, a yield point in its elongation of 500%, and a hardness of 45. The product had a strong elasticity even at the low temperature of —50° C.

EXAMPLE 13

A composition was formulated containing 100 parts of the polyhydroxy polybutadiene polymer as shown in Example 7 uniformly admixed with 10 parts of a polypropylene ether glycol having a molecular weight of 3,000 manufactured by Nippon Soda Co., Ltd., 30 parts of carbon black (HAF) and 0.35 parts of dibutyltin dilaurate. The composition was admixed with 8.5 parts of toluenediisocyanate, and was cast molded at 20° C. for 48 hours. The resulting cured product had a tensile strength of 120 kg./cm.$^2$, a yield point in its elongation of 450%, and a hardness of 50.

EXAMPLE 14

A living polybutadiene polymer having a molecular weight of 2,500 was prepared by polymerizing 25 g. of butadiene with the dilithium initiator used in Example 1. The polymer was reacted with 15 millimoles of epichlorohydrin (1.5 moles per mole of living polymer) at room temperature. A 40 millimole quantity of phthalic anhydride in tetrahydrofuran was added to the product and reacted at room temperature for 5 hours while stirring. After the reaction, 0.25 g. of 2,6-di-tert-butyl-p-cresol was added and the product was treated with a methanol-hydrochloric acid solution. The product was purified by reprecipitation from a toluene-methanol solution to yield 25 g. of polymer. Analysis of the infrared spectrum of the resulting polymer confirmed the presence of associated hydroxyl groups and carbonyl groups. The average molecular weight of the polymer was about 7500 which shows the incorporation of three living polymer molecules per molecule of product polymer. The number of carboxyl groups incorporated in the product is about 3.2 groups per molecule of product polymer. A 5 g. quantity of the resulting polymer was admixed with 5 g. of an epichlorohydrin bisphenol A epoxy compound manufactured by Shell Col. (Epicoat 828). The resulting transparent mixture was reacted at 120° C. in the absence of oxygen for 15 hours to yield a colorless, transparent rubber-like elastomer which had adhesive properties.

EXAMPLE 15

The process of Example 14 was repeated, except that 50 millimoles of succinic anhydride were used instead of 40 millimoles of phthalic anhydride. The resulting polymer had a molecular weight of about 6000 and the number of carboxyl groups per molecule of polymer was about 3.

EXAMPLE 16

A 50 g. quantity of butadiene was polymerized in the presence of 20 millimoles of a dilithium initiator prepared by reacting a small amount of naphthalene, lithium metal and isoprene in diethyl ether. The resulting living polybutadiene had a molecular weight of 2500, and was reacted with 30 millimoles of epichlorohydrin (1.5 moles per mole of living polymer) for 10 hours. An 80 millimole quantity of maleic anhydride in tetrahydrofuran was admixed with it and the mixture was reacted first at room temperature for 1 hour and then reacted at 70° C. for 3 hours. The reaction mixture was stabilized by adding di-tert-butyl-p-cresol, and was isolated by conventional procedures. The resulting polymer had a number average molecular weight of 6000, contained 45% diene units and had a second transition temperature of 70° C. The yield of the product was 45 g. Analysis of the infrared spectrum of the polymer confirmed the presence of ester groups. A polymerizable polymer composition was formed by mixing 9.0 g. of the polymer and 1.0 g. of styrene. A 0.2 g. quantity of benzoyl peroxide was added to the composition and the mixture was cured at 100° C. for 2 hours. The resulting solid elastomer had a tensile strength of 110 kg./cm.$^2$, a yield point in its elongation of 350%, and a hardness of 50 (Japan Ind. Standard).

(Reference 2)

A 9.0 g. quantity of polybutadiene untreated with epichlorohydrin and having a low molecular weight was prepared in methanol, as shown in Example 14. The living polymer was admixed with 1.0 g. of styrene. To this composition was added 0.2 g. of benzoyl peroxide and the mixture was cured at 100° C. for 2 hours. However, only a semi-solid adhesive product was obtained.

The same process was repeated, except that 7.0 g. of polybutadiene and 3.0 g. of styrene were used. The resulting adhesive cured product had a tensile strength of 9 kg./cm.$^2$ and a yield point in its elongation of 100%.

EXAMPLE 17

A polymer similar to the one prepared in Example 16 was prepared, except that 80 millimoles of methylmethacrylate were employed instead of 80 millimoles of maleic anhydride. A composition was prepared using this polymer, and it was cured by the process shown in Example 16. The resulting solid elastomer had a tensile strength of 60 kg./cm.$^2$, a yield point in its elongation of 350%, and a hardness of 45.

EXAMPLE 18

In 100 millilitres of tetrahydrofuran, 0.1 mole of naphthalene was reacted with 8 g. of sodium metal. The excess sodium metal was filtered to prepare a 1.0 N sodium initiator solution. A 50 g. quantity of butadiene was polymerized in the presence of 40 millimoles of the initiator to yield a product having a molecular weight of 2500. The living polymer was reacted first with 1.8 millilitres of epichlorohydrin (1.15 moles per mole of living polymer) and then reacted with 80 millimoles of maleic anhydride in tetrahydrofuran. The reaction product was isolated by conventional procedures to yield a polymer having a molecular weight of 5000. Analysis of the infrared spectrum of the polymer confirmed the presence of ester groups. An 8.0 g. quantity of the polymer was admixed with 2.0 g. of styrene to form a curable polymer composition. A 0.1 g. quantity of benzoyl peroxide was added to the composition and the mixture was cured at 90° C. for 3 hours. The resulting solid elastomer had a tensile strength of 92 kg./cm.$^2$ and a yield point in its elongation of 250%.

EXAMPLE 19

The living polybutadiene polymer having a molecular weight of 2500 prepared as shown in Example 16 was reacted with 30 millimoles of epichlorohydrin (1.5 moles per mole of living polymer) at room temperature for 15 hours. This product was then reacted with acrylic chloride, and the resulting product was purified by conventional procedures. The resulting polymer had a molecular weight of 5500, 57% diene units and a glass transition temperature of —70° C. Analysis of the infrared spectrum of the polymer confirmed the presence of ester groups. An 8.0 g. quantity of the polymer was admixed with 2.0 g. of styrene to form a curable polymer composition. To the composition was added 0.1 g. of benzoyl peroxide and the mixture was cured at 90° C. for 3 hours. The resulting solid elastomer had a tensile strength of 60 kg./cm.$^2$ and a yield point in its elongation of 310%.

EXAMPLE 20

The curable polymer composition of Example 16 was admixed with 0.5 g. of cobalt naphthenate and methylethylketone peroxide. The mixture was cured at 20° C. for 24 hours. The resulting elastomer had a tensile strength of 65 kg./cm.$^2$, a yield point in its elongation of 400%, and a hardness of 55. It also had no adhesive properties.

EXAMPLE 21

A 25 g. quantity of butadiene was polymerized in the presence of 10 millimoles of the dilithium initiator prepared as shown in Example 16. The resulting living polybutadiene polymer had a molecular weight of 2500 and was reacted with 15 millimoles of epichlorohydrin (1.5 moles per mole of living polymer) as shown in Example 16. A 40 millimole quantity of acrylic chloride was reacted with the living polymer. A 25 g. yield of this polymer was obtained which had a molecular weight of 5200. An infrered absorption spectrum of the product confirmed the presence of an ester.

Having now fully described the invention, it will be apparent to one of ordinary skill in the art that many changes and modifications can be made thereto without departing from the spirit or scope of the invention as set forth herein.

Accordingly, what is claimed and intended to be secured by Letters Patent is:

1. In a process for producing a liquid polyhydroxydiene polymer having terminal and pendant hydroxy groups obtained from the reaction of a liquid, living polymer prepared by reacting a conjugated diolefin or a mixture of the conjugated diolefin and a vinyl compound having the formula:

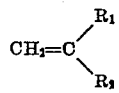

wherein $R_1$ represents a hydrogen atom or an alkyl group, and $R_2$ represents an aryl group or a pyridyl group in the presence of sodium or lithium metal or an organo sodium or lithium compound, the improvement comprising reaction 1 mole of said liquid, living polymer with 0.5 mole to 2 moles of epichlorohydrin, epibromohydrin, epifluorohydrin, chlorobutylene oxide, or bromobutylene oxide wherein the polyhydroxydiene polymer consists of a number of liquid, living polymer units separated by hydrocarbon units having pendant OH groups attached to them.

2. The process of Claim 1, wherein the vinyl compound content of the liquid living polymer is less than 25% by weight, and wherein the content of the conjugated diolefin units is greater than 30%.

3. The process of Claim 1, which comprises treating the resulting polyhydroxy diene polymer with a protonic acid.

References Cited
UNITED STATES PATENTS 3,135,716   6/1964   Uroneck et al. __ 260—94.7 A X
3,308,170   3/1967   Pritchett et al. _____ 260—632

JOSEPH L. SCHOFER, Primary Examiner

W. F. HAMROCK, Assistant Examiner

U.S. Cl. X.R.

260—78.4 EP, 82.1, 85.1, 94.7, 879, 41.5

UNITED STATES PATENT OFFICE
CERTIFICATE OF CORRECTION

PATENT NO. : 3,830,855
DATED : August 20, 1974
INVENTOR(S) : JIHEI INOMATA ET AL It is certified that error appears in the above-identified patent and that said Letters Patent are hereby corrected as shown below:

Column 1, in the heading, insert the following:

--Claims priority, Japanese patent application, August 18, 1971, 62822/1971; Japanese patent application, December 9, 1971, 99643/1971; Japanese patent application, December 23, 1971, 104849/1971.--

Signed and Sealed this thirtieth Day of September 1975

[SEAL]

Attest:

RUTH C. MASON
Attesting Officer

C. MARSHALL DANN
Commissioner of Patents and Trademarks